(12) United States Patent
Yang et al.

(10) Patent No.: US 9,921,292 B2
(45) Date of Patent: Mar. 20, 2018

(54) EFFICIENT LOCATION DETERMINATION OF WIRELESS COMMUNICATION DEVICES USING HYBRID LOCALIZATION TECHNIQUES

(71) Applicants: Xue Yang, Arcadia, CA (US); Lei Yang, Hillsboro, OR (US); Xiaoyong Pan, Shanghai (CN)

(72) Inventors: Xue Yang, Arcadia, CA (US); Lei Yang, Hillsboro, OR (US); Xiaoyong Pan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/301,201

(22) PCT Filed: Jun. 30, 2014

(86) PCT No.: PCT/US2014/044801
§ 371 (c)(1),
(2) Date: Sep. 30, 2016

(87) PCT Pub. No.: WO2016/003395
PCT Pub. Date: Jan. 7, 2016

(65) Prior Publication Data
US 2017/0108575 A1    Apr. 20, 2017

(51) Int. Cl.
*H04W 24/00* (2009.01)
*G01S 5/02* (2010.01)
(Continued)

(52) U.S. Cl.
CPC .......... *G01S 5/0252* (2013.01); *H04B 17/318* (2015.01); *H04L 67/18* (2013.01); *H04W 4/023* (2013.01); *H04W 64/00* (2013.01)

(58) Field of Classification Search
None
See application file for complete search history.

(56) References Cited

U.S. PATENT DOCUMENTS 8,570,993 B2 * 10/2013 Austin .................... H04W 4/02
370/338
2003/0008668 A1   1/2003 Perez-Breva et al.
(Continued)

OTHER PUBLICATIONS

International Search Report and Written Opinion for International Application No. PCT/US2014/044801 dated Mar. 26, 2015 (13 pgs).
(Continued)

*Primary Examiner* — Erika Washington
(74) *Attorney, Agent, or Firm* — Eversheds Sutherland (US) LLP (57) ABSTRACT

Embodiments herein relate to determining the location of a device using hybrid localization techniques. For example, a first technique such as trilateration may be used to determine an approximate location of the device. An error associated with the approximate location may also be implemented to increase the likelihood of locating the device upon applying a second localization technique, such as fingerprinting. Fingerprinting, when applied to the approximate location determined from trilateration, may determine the location of the device, or a more precise location than that determined from trilateration, such that reduced power consumption by the device may be achieved without sacrificing location accuracy.

20 Claims, 4 Drawing Sheets (51) Int. Cl.
H04W 64/00 (2009.01)
H04B 17/318 (2015.01)
H04L 29/08 (2006.01)
H04W 4/02 (2018.01)

(56) References Cited

U.S. PATENT DOCUMENTS

| | | |
|---|---|---|
| 2004/0102198 A1 | 5/2004 | Diener et al. |
| 2006/0089153 A1 | 4/2006 | Sheynblat |
| 2011/0143772 A1 | 6/2011 | Sridhara et al. |
| 2012/0142366 A1 | 6/2012 | De Castro Riesco et al. |
| 2013/0079033 A1 | 3/2013 | Gupta et al. |
| 2013/0225209 A1 | 8/2013 | Chen et al. |
| 2013/0273938 A1 | 10/2013 | Ng et al. |
| 2014/0171114 A1* | 6/2014 | Marti .................. G01C 21/10 455/456.2 |

OTHER PUBLICATIONS

Supplementary European Search Report issued in Application No. 14896725.0, dated Jan. 23, 2018 (9 pages).

* cited by examiner

EFFICIENT LOCATION DETERMINATION OF WIRELESS COMMUNICATION DEVICES USING HYBRID LOCALIZATION TECHNIQUES

CROSS-REFERENCE TO RELATED APPLICATION

This application is a U.S. National Stage Application under 35 U.S.C. 371 and claims the priority benefit of International Application No. PCT/US2014/044801, filed Jun. 30, 2014, the contents of which application are hereby incorporated herein by reference in their entirety.

BACKGROUND

Wireless devices are increasingly dependent upon their location as context for various applications. In determining location, these devices may employ various location techniques which, unfortunately, may consume a large amount of power in battery-powered devices. As a result, such devices may experience a reduced available power source to reliably perform their various functions.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Embodiments herein relate to, among other things, efficient location determination of wireless communication devices using hybrid localization techniques. The location of wireless communication devices, such as smart phones, mobile phones, or other user devices, may be determined in a manner that requires reduced power consumption by the user devices without sacrificing location accuracy. In certain embodiments herein, a first localization technique, such as trilateration, may be implemented to determine an approximate location of a user device based at least in part on received signal strength indicators (RSSIs) received by the user device from wireless access points. The approximate location of the user device may include one or more candidate locations, any of which may be the actual location of the user device. An error that increases the number of such candidate locations, or put another way, the region in which the user device may be located, may also be determined to increase the likelihood that the determined location of the user device is within an acceptable tolerance or statistical confidence.

A second localization technique, such as fingerprinting, may be implemented to determine the location of the user device, in part, by considering only the candidate locations determined from the trilateration approach. Thus, only a portion of a total number of fingerprint entries for an area or region in which the user device resides may be considered in determining the location (e.g., a more precise location than that determined by trilateration) of the user device. For example, for each of the candidate locations, the RSSIs received by the user device may be compared to stored RSSIs for the candidate locations to determine the best match based on such RSSIs, in one embodiment. One or more locations that correspond to the RSSIs that provide the best match may be determined as the best one or more locations of the user device.

The above descriptions are for purposes of illustration and are not meant to be limiting. Numerous other descriptions, examples, techniques, etc., may exist in other embodiments, some of which are described in the following text.

Figure 1:
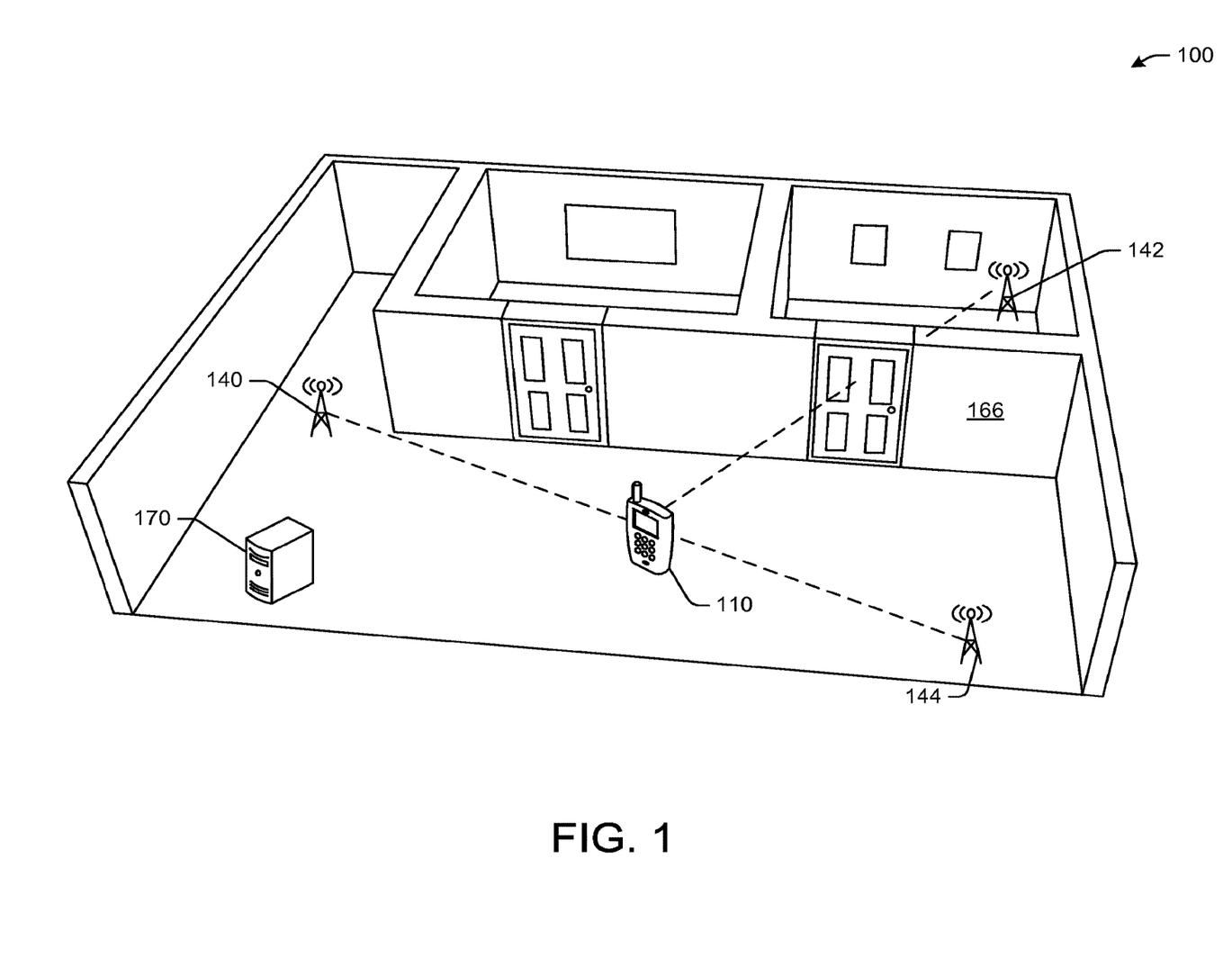
FIG. 1 illustrates an example environment in which the location of a wireless communication device may be determined according to techniques described herein, in an embodiment of the disclosure.

FIG. 1 depicts an example environment 100 in which the location of a wireless communication device, such as a user device 110, may be determined according to techniques described herein. In certain embodiments, the example environment 100 may include an indoor facility, such as an office, a residence, or other interior space that may include walls 166 and other items located within the interior space. The location of a wireless communication device may be determined in such areas in certain embodiments herein. Other embodiments may relate to determining the location of a wireless communication device in outdoor areas.

As shown in FIG. 1, the environment 100 may include, but is not limited to, the user device 110, access points 140, 142, and 144, and a server 170. Although a certain number of each device is shown in FIG. 1, fewer or more of the devices may exist in other embodiments. For example, more access points may exist and at least a portion of the access points (for example, three access points 140, 142, and 144) may be utilized by the user device 110 to determine its location, for example, by applying trilateration and fingerprinting localization techniques, as will be described in greater detail below.

The user device 110 may receive information from all or at least a portion of the access points 140, 142, and 144. The information may be received as a WiFi signal, WiFi Direct signal, Bluetooth, Near Field Communication (NFC) signal, or various other types of communications signals. The received information may include a Received Signal Strength Indicator (RSSI), a unique identification of the access point from which the RSSI was received, etc. In certain embodiments herein, trilateration may be applied to determine an approximate location of the user device 110. For example, the RSSI received from each access point 140, 142, and 144 may be used to estimate a distance between the access points 140, 142, and 144 by determining an overlapping portion of logical spheres that surround each of the access points 140, 142, and 144, where the estimated distance may be the radius of each of the logical spheres. The overlapping portion of the spheres, whether the same point or a group of overlapping points, may be used to determine the approximate location of the user device 110.

An error associated with the trilateration approach may also be used in conjunction with the approximate location of the user device 110 to determine a region or range within which the user device 110 may reside. Locations within such a region or range may be referred to herein as candidate locations.

Various techniques may be used to select which access points may be used in trilateration to determine the approximate location of the user device 110. Such techniques may include selecting a certain number (e.g., three) of access points based on their RSSI and location with respect to the user device 110. In one embodiment, access points having relatively stronger RSSIs and that are positioned on largely different sides of the user device 110, for example, may be selected.

In certain embodiments herein, fingerprinting (e.g., RSSI fingerprinting) may be used in conjunction with trilateration to determine a more precise location of the user device 110. As used herein, a more precise location may mean that the location determined by fingerprinting may be more accurate than the location determined by trilateration. Such a more precise location may also be referred to herein as simply the location, for example, of the user device 110. The location determined by trilateration may be referred to as an approximate location in such instances. Such an approximate location may include one or more candidate locations by virtue of a larger portion of the logical spheres associated with the access points 140, 142, and 144 that are overlapping, and/or a region or area that is expanded by an error determined in association with trilateration. Detailed examples of such processes will be described in greater detail below.

The server 170 may include one or more databases for storing information that may be used to determine a location of a user device 110. For example, the server 170 may store fingerprinting information, such as the coordinates for each point or location in a space, such as the environment 100, and RSSIs measured at each of the points or locations. The server 170 may also store information associated with trilateration, such as the location of the access points 140, 142, and 144, and corresponding unique identifiers associated with such access points. Various other information may be stored in other embodiments.

The information stored by the server 170 may be provided upon request by the user device 110; upon the occurrence of the server 170 detecting a change in the information, such as the relocation of an access point, the removal or addition of an access point, etc.; or other changes in information used by the trilateration or fingerprinting localization techniques. The user device 110 may determine its location based at least in part on such information, in one embodiment. In other embodiments, the server 170 may determine the location of the user device 110 based at least in part on such information.

Communication between the user device 110 and the server 170 may occur over a cellular network, in certain embodiments herein. In other embodiments, communication between the user device 110 and the server 170 may occur via the WiFi protocol, WiFi Direct protocol, or various other communication protocols. As non-limiting examples, the user device 110 and the server 170 may communicate with each other through one or more access points 140, 142, or 144 (e.g., using the WiFi protocol), or may communicate directly with one another using the WiFi Direct protocol.

A wireless network herein, such as that which may be used to enable communication between the devices in FIG. 1, may utilize various frequencies to enable such communication. For example, some wireless networks may utilize a frequency of 2.4 GHz for communicating as defined by the Institute of Electrical and Electronics Engineers (IEEE) 802.11b, and g specification. Other wireless networks may utilize a frequency of 5 GHz for communicating as defined by the IEEE 802.11a specification. IEEE 802.11a and b were published in 1999, and IEEE 802.11g was published in 2003. Devices that comply with the IEEE 802.11b standard may commonly be referred to or marketed as wireless fidelity (Wi-Fi) compatible devices. Some wireless networks may operate in millimeter wave frequencies (e.g., 60 GHz band).

The above descriptions for FIG. 1 are for purposes of illustration and are not meant to be limiting. Various other descriptions, configurations, etc., may exist in other embodiments. For example, the location of the access points 140, 142, and 144 with respect to the user device 110 may vary. Further, one or more of the access points 140, 142, and 144, as well as the server 170, may be located external to the environment 100. Further, while certain embodiments herein relate to determining the location of the user device 110 using the trilateration and fingerprint techniques, other localization techniques may also be used. Generally, a first location estimation technique may be applied to determine a general or approximate location of the user device 110, or other device. A second location estimation technique may thereafter be applied to determine the location (e.g., a more precise location than that determined by the first applied localization technique) of the user device 110. According to this example, the second location estimation technique may be more accurate than the first location estimation technique, and may also be relatively more central processing unit (CPU)-intensive, consume relatively more power, or may require relatively more computing resources than the first location estimation technique to determine the location of the user device 110. In some implementations, time of flight (ToF) may be used to determine the approximate location of the user device 110. For example, the travel time of radio waves may be converted to a distance between the user device 110 and the access point 140 from which the radio waves were received, and may therefore be used to determine the location of the user device 110.

Figure 2:
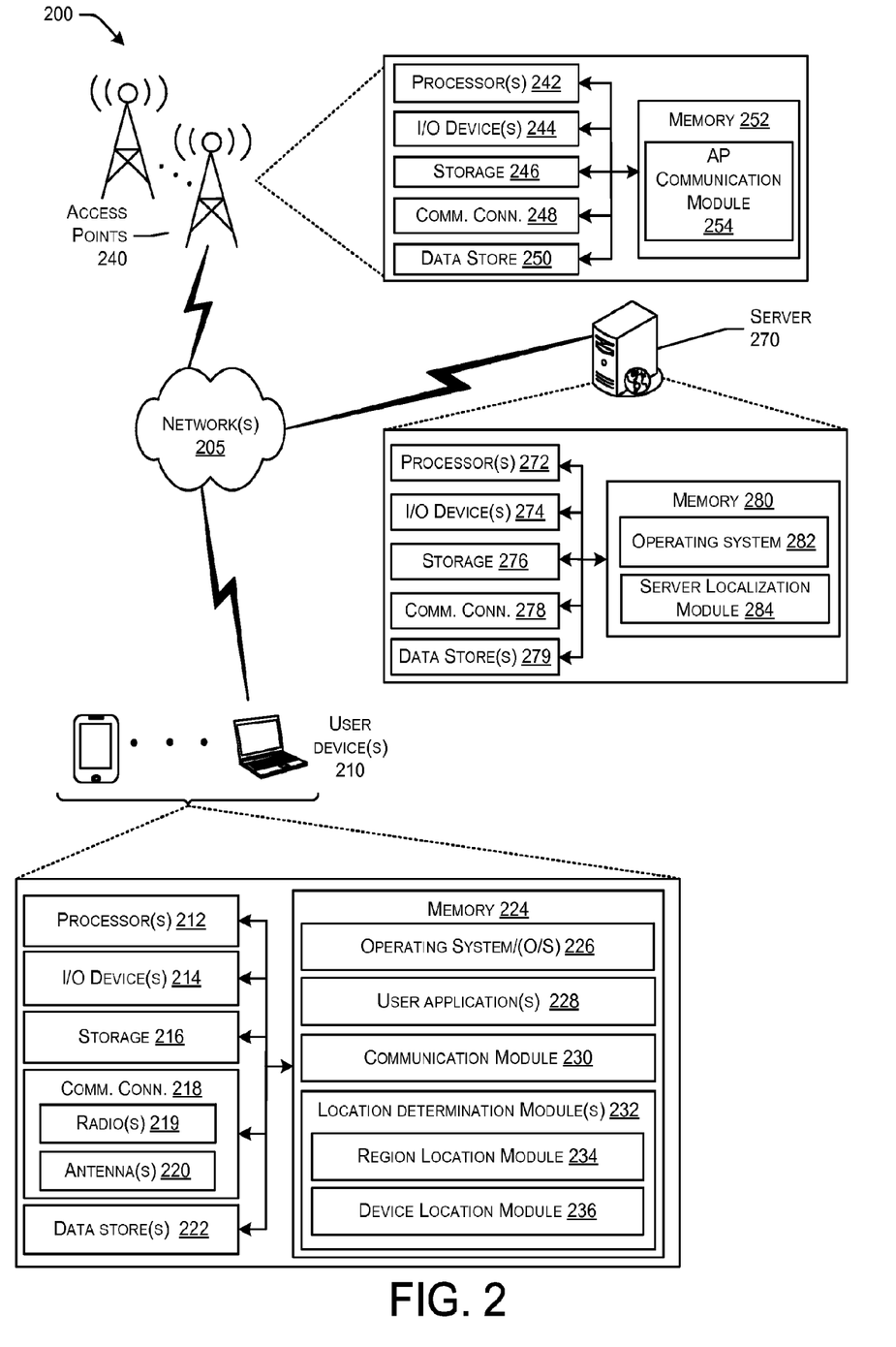
FIG. 2 illustrates a computing environment for implementing efficient location determination of wireless communication devices using hybrid localization techniques, according to an embodiment of the disclosure.

FIG. 2 depicts a computing environment 200 for implementing efficient location determination of wireless communication devices using hybrid localization techniques, according to an embodiment of the disclosure. The example computing environment 200 may include, but is not limited to, a wireless communication device, such as a user device 210, a server 270, and one or more access points 240. In one embodiment, these devices may be embodied by their corresponding devices in FIG. 1. As described, the user device 210 may receive information, such as RSSIs, from the one or more access points 240 and the server 270 over one or more networks 205 to facilitate determining a location of the user device 210. The user device 210 may receive such information (e.g., via sniffing RSSIs or other information) without establishing a connection for communication with the access points 240, in one embodiment.

As used herein, the term "device" may refer to any computing component that includes one or more processors that can be configured to execute computer-readable, computer-implemented, or computer-executable instructions. Example devices can include personal computers, server computers, server farms, digital assistants, smart phones, personal digital assistants, digital tablets, smart cards, wearable computing devices, Internet appliances, application-specific circuits, microcontrollers, minicomputers, transceivers, kiosks, or other processor-based devices. The execution of suitable computer-implemented instructions by one or more processors associated with various devices may form special purpose computers or other particular machines that may implement or facilitate the processes described herein.

As used herein, the relevant subset of fingerprint locations, or similar, may also be referred to herein as the relevant subset of candidates locations. In certain embodiments herein, the relevant subset of candidates locations may include a number of fingerprint locations that are less than the total number of fingerprint locations stored for an area or space, and by virtue of being a reduced number of fingerprint locations, may be used to determine the location of a device in a more efficient manner such that less power is consumed by the device that determines the location.

The user device 210 may include a radio receiver (not shown). A physical layer interface in the radio receiver may include a radio frequency (RF) unit that may be configured to provide for reception of one or more RF signals at one or more frequencies. According to one configuration, the RF unit may include an amplifier, a mixer, a local oscillator, and so forth. The RF unit may be implemented as discrete electronic components, integrated circuits, software-defined radio, or a combination thereof, according to various configurations. The user device 210 may further include a radio transmitter that may send one or more RF signals to one or more access points, such as the access points 240. In some configurations, the user device 210 may include a radio transceiver that may receive and send RF signals. A transceiver (or the receiver and/or the transmitter) may be coupled to one or more antennas (e.g. antennas associated with the user device 210. In one embodiment a single wireless interface may include multiple antennas that may be used to reduce the effects of multipath fading on received signals, for example, when signals sent between devices are deflected off one or more walls 166 in the environment 100 in FIG. 1. The server 270 may also be configured with a radio receiver and transmitter (or transceiver) that is the same or similar to that associated with the user device 210, in one embodiment. The server 270 may also be equipped with a wired network (e.g., Ethernet) to enable the server 270 to connect to a cellular network, which may connect to a backbone wired network.

Various types of networks 205 may facilitate communication between the devices shown in FIG. 2. Such networks may include any number of wireless or wired networks that may enable various computing devices in the computing environment 200 to communicate with one another. In some embodiments, other networks, intranets, or combinations of different types of networks may be used including, but not limited to, WiFi networks, WiFi Direct networks, NFC networks, Bluetooth® networks, cellular networks, radio networks, satellite networks, other short-range, mid-range, or long-range wireless networks, the Internet, intranets, cable networks, landline-based networks, or other communication mediums connecting multiple computing devices to one another. In certain embodiments herein, the user device 210 may not communicate with the access points, for example, to receive information from the access points. Communication between the user device 210 and the server 270 via WiFi, cellular, or various wireless communication media. The server may be connected through either wired or wireless networks, in various embodiments herein.

The devices 210, 240, and 270 may include one or more processors configured to communicate with one or more memory devices and various other components or devices. For example, the user device 210 may include one or more devices that include one or more processors 212, one or more input/output (I/O) devices 214, storage 216, one or more communication connections 218, and one or more data stores 222. The one or more processors 212 may be implemented as appropriate in hardware, software, firmware, or a combination thereof. The one or more processors 242 and 272 associated with the access points 240 and the server 270, respectively, may be the same or at least similar to the processor 212.

The memory 224 associated with the user device 210 may store program instructions that are loadable and executable on the processor 212, as well as data generated during the execution of these programs. Depending on the configuration and type of the user device 210, the memory 224 may be volatile, such as random access memory (RAM), static random access memory (SRAM), dynamic random access memory (DRAM); or non-volatile, such as read-only memory (ROM), Electrically Erasable Programmable Read-Only Memory (EEPROM), flash memory, etc. The memories 252 and 280 associated with the access points 240 and the server 270, respectively, may be the same or at least similar to the memory 224.

The storage 216 associated with the user device 210 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing system. The storage 246 and 276 associated with the access points 240 and the server 270, respectively, may be the same or at least similar to the storage 216.

The memories 224, 252, and 280, and the storage 216, 246, and 276, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data.

The I/O devices 214 associated with the user device 210 may enable a user to interact with the user device 210 to perform various functions. The I/O devices 214 may include, but are not limited to, a keyboard, a mouse, a pen, a voice input device, a touch input device, a gesture detection or capture device, a display, a camera or an imaging device, speakers, and/or a printer. The I/O devices 244 and 274 associated with the access points 240 and the server 270, respectively, may be the same or at least similar to the I/O devices 214.

The communication connections 218 associated with the user device 210 may allow the user device 210 to communicate with other devices, such as the access points 240 and the server 270, over the one or more wireless networks 205. The communication connections 218 may include one or more antennas 220 and one or more radios 219, which may include hardware and software for sending and/or receiving wireless signals over the various types of networks 205 described above. The communication connections 248 and 278 associated with the access points 240 and the server 270, respectively, may be the same or similar to the communication connections 218. In one embodiment, the server 270 may be configured to communicate with the user device 210, or other devices, via a cellular network. In other embodiments, the communication connections 278 may include one or more radios and antennas that may enable the server 270 to receive and/or send wireless signals to the user device 210 and/or to the access points 240, which may route wireless signals between the user device 210 and the server 270.

The one or more data stores 222 may store lists, arrays, databases, flat files, etc. In some implementations, the data store 222 may be stored in a memory external to the user device 210 but may be accessible via one or more networks, such as with a cloud storage service. The data store 222 may store information that may facilitate efficient location determination of the user device 210 using localization techniques. Such information may include, but is not limited to, fingerprint information such as coordinates of multiple locations within an area (e.g., X, Y coordinate locations repeated for a certain distance throughout the area); corresponding RSSI measurements for each of the coordinate locations; locations of access points within range of the area; historical information, such as previous locations determined by the user device 210 based on one or more RSSIs received by the user device 210; an acceptable error for use in selecting candidate locations (e.g., 5 meters, 10 meters, etc.) in association with trilateration calculations; a stored number of fingerprinting locations identified within an approximate area or region in which the user device 210 may reside (e.g., a number of candidate locations); stored distances between the user device 210 and the access points 240, such as the Manhattan distance, Euclidean distance, etc.; an amount of processing time required to determine the location of the user device 210; a comparable amount of time required to determine the location using fingerprinting; identifying information associated with the access points 240 and the user device 210; and various other information that may facilitate the processes described herein. All or at least a portion of the information stored in the data store 222 may also be stored in the one or more data stores 250 or data stores 279 associated with the access points 240 and the server 270 or the access points 240, respectively. As described above, the user device 210 may access at least a portion of the information from such devices and use the information to determine the location of the user device 210.

Turning to the contents of the memory 224, the memory 224 may include, but is not limited to, an operating system (O/S) 226, one or more user applications 228, a communication module 230, and a location determination module 232. Each of the modules 228, 230, and 232 may be implemented as individual modules that provide specific functionality associated with efficient determination of the location of a wireless communication device (e.g., the user device 210) using hybrid localization techniques. Alternatively, one or more of the modules 228, 230, and 232 may perform all or at least some of the functionality associated with the other modules.

The operating system 226 may refer to a collection of software that manages computer hardware resources and provides common services for computer programs to enable and facilitate the operation of such programs. Example operating systems may include UNIX, Microsoft Windows, Apple OS X, etc. The operating system 282 associated with the server 270 may be the same or similar as to the operating system 226, in one embodiment.

The one or user applications 228 may perform any number of functions, including enabling a user to view and/or interact with content (e.g., text, data, video, multimedia, or other information). In some embodiments, a user application 228 may communicate with the location determination module 232 to obtain customized results associated with the location of the user device 210. For example, the user application 228 may request that the location determination module 232 provide a certain number of determined possible locations of the user device 210 (e.g., the top 3, 5, 10, etc., determined locations). User applications 228 that rely more heavily on the precise location of the user device 210, for example, may receive a greater number of possible locations from the location determination module 232 to increase the likelihood that at least one of the possible locations includes the precise location of the user device 210. User applications 228 that may rely less on the precise location of the user device 210 may receive relatively fewer (e.g., one location or the best match location) possible locations of the user device 210 from the location determination module 232, in another example. In this way, the location determination module 232 may provide customized results to various user applications 228, program modules, computing devices, etc., based on the severity (e.g., high corresponding to a need for a relatively high number of possible locations of the user device 210; medium corresponding to a need for relatively fewer possible locations of the user device 210; and low corresponding to a need for relatively the fewest number of possible locations of the user device 210) or the need for improved localization of the user device 210, in certain embodiments. In one embodiment, low severity or a low accuracy requirement may correspond to using the first localization technique (e.g., trilateration), while the high severity or high location accuracy may correspond to using the first location technique (e.g., trilateration) along with the second localization technique (e.g., fingerprint) to provide the high location accuracy.

The communication module 230 may enable the user device 210 to communicate with the server 270 and receive information from the access points 240, to facilitate the processes described herein. The communication module 230 may implement various wireless communications protocols, such as WiFi, WiFi Direct, etc. The communications module 232 may also include various modulation techniques for modulating signals. Such signals may include information in frames distributed over the one or more networks 205, such as Orthogonal Frequency Division Multiplexing (OFDM), dense wave division multiplexing (DWDM), phase-shift keying (PSK), frequency-shift keying (FSK), amplitude-shift keying (ASK), and quadrature amplitude modulation (QAM), among other techniques. Each of the devices shown in FIG. 2 may utilize such modulation techniques, as well as demodulation techniques, to access information from a modulated signal.

The location determination module 232 may include a region location module 234 and a device location module 236. Application of both the modules 234 and 236 may be referred to herein as hybrid localization in the way that at least two different approaches may be used to determine a location of the user device 210 in an efficient manner so that relatively less power is consumed when determining the location of the user device 210, among other things.

The region location module 234 may determine a region or area in which a user device 210 may reside. Such a region or area may include one or more candidate locations, any of which may be the location of the user device 210. In one embodiment, the region location module 234 may implement trilateration to determine an approximate location of the user device 210. As described above, trilateration may include estimating a distance between the access points 240 and the user device 210 in part by determining an overlapping portion of logical spheres that may surround each of the access points 240 used in a trilateration calculation. The overlapping portion of the spheres, whether the same point or a group of overlapping points, may be used to determine the approximate location of the user device 210. In so doing, the user device 210 (e.g., via the communication module 230) may receive RSSIs from multiple access points 240 (e.g., three access points 240). The region location module 234 may analyze the RSSIs to determine a distance between the access points 240 and the user device 210. In one embodiment, such distances may be the radius, or approximate radius, of the logical spheres surrounding each of the access points 240.

The region location module 234 may also determine the approximate location of the user device 210 based on the determined distance between the access points 240 and the user device 210. In one embodiment, the region location module 234 may determine the location of the access points 240 from which the RSSIs were received. The region location module 234 may access such locations as stored in a data store, such as the data store 279 of the server 270, the data store 222 of the user device 210, or other data stores, databases, etc. In one embodiment, the region location module 234 may determine such locations by comparing a unique identifier received from the access points 240 to stored unique identifiers. The locations for matching unique identifiers may be used in the location calculation for the user device 210. For example, upon determining the location of the access points 240, the region location module 234 may determine an approximate location of the user device 210 by adding the determined distance between the access points 240 and the user device 210 to at least one coordinate of the location of the access points 240. Various techniques may be used to determine the approximate location of the user device 210 such as, but not limited to, the centroid of the overlapping access point area.

The region location module 234 may also determine an error in conjunction with determining the approximate location of the user device 210 as described above, in one embodiment. In one embodiment, the approximate location of the user device 210 as determined by trilateration may be modified by such an error. The error may be used to adjust (e.g., expand or contract) the calculated region to include additional or fewer candidate locations. Any value can be used for the error. In one embodiment, the error may be established such that it provides a statistical confidence (e.g., 95% certainty) that the user device 210 is within the region. In other embodiments, the error may be a predetermined value (e.g., 10.0 meters, 20.0 meters, etc.) such that the error adjusts the radius of the region by the predetermined value. For example, an error of 10.0 meters may expand the radius of a region or approximate location of the user device 210 by 10.0 meters to include more candidate locations than were included in the initial calculation of the region. Examples of such adjustments will be described in greater detail below.

The device location module 236 may determine a location of the user device 210 (e.g., a more precise location than that determined by the region location module 234). In one embodiment, the device location module 236 may implement fingerprinting to determine the location of the user device 210. As described, fingerprinting may include storing information about a particular space or area, such as the indoor environment 100 in FIG. 1, in a database that may be referred to herein as the fingerprint database. The stored information may include, but is not limited to, a location of a point in the space or area; such as an X,Y coordinate location of a point every certain distance in the space or area (e.g., a location every 1 meter, 2 meters, 0.5 meters, etc.); and corresponding RSSIs received at each point. RSSIs received by the user device 210 (e.g., by the communication module 230) may be compared to the stored RSSIs to determine one or more locations associated with the received RSSIs, as will be described in greater detail below.

In certain embodiments herein, the candidate locations determined by the region location module 234 may be analyzed by the device location module 236 to determine the location of the user device 210. In one embodiment, each location stored in the fingerprint database may be compared to the approximate location of the user device 210, for example, as determined by the region location module 234.

In one implementation, a relevant subset of fingerprint locations may be determined by comparing a distance between locations in the fingerprint database to the approximate location of the user device 210. If the distance between a fingerprint location and the approximate location of the user device 210 is less than the error implemented by the region location module 234, then the device location module 236 may add the fingerprint location to the relevant subset of fingerprint locations, in one embodiment. The device location module 236 may also, or alternatively, add the fingerprint location to the relevant subset of fingerprint locations if the distance between the fingerprint location and the approximate location of the user device 210 is less than the distance between the furthest point in the region or area determined by the region location module 234 and the approximate location of the user device 210. Put another way, fingerprint locations may be added to the relevant subset of fingerprint locations if the fingerprint location is within the region or area determined by the region location module 234, whether such region or area is expanded by an error value or not.

If the distance between the fingerprint location and the approximate location of the user device 210 is greater than the error, greater than the distance between the furthest point in the region or area determined by the region location module 234 and the approximate location of the user device 210, or otherwise outside of the region or area determined by the region location module 234, then the fingerprint location may not be added to the relevant subset of fingerprint locations or may be otherwise ignored. The respective distances between the fingerprint locations and the approximate location of the user device 210 may be determined using the Manhattan distance, the Euclidean distance, or various other techniques.

In the manner described above, each location in the fingerprint database may be compared to the approximate location of the user device 210 to determine whether the location in the fingerprint database should be added to the relevant subset of fingerprint locations, and hence, may be a location (or more precise location than that determined by the region location module 234) of the user device 210. Thus, a reduced number of locations in the fingerprint database may be analyzed more quickly and efficiently to determine the location of the user device 210 than analyzing the entire number of locations in the fingerprint database. Such a reduced number of fingerprint locations may be determined based on the candidate locations determined by the region location module 234 as described above. For example, when the user device 210 receives RSSIs from one or more of the access points 240, the device location module 236 may compare the received RSSIs with stored RSSIs for only the locations in the relevant subset of fingerprint locations.

Upon determining a match between received RSSIs and stored RSSIs (e.g., an exact match; a top percentage of fingerprint locations that represent the best match (e.g., top 5%, top 10%, etc.); a top number of fingerprint locations that represent the best match (e.g., top 3, 5, 10, etc.), the one or more locations resulting from the match may be determined as the location of the user device 210. In this way, the location of the user device 210 may be determined using a hybrid localization technique that consumes relatively less power than that which would be required by applying fingerprinting to all locations in the fingerprint database, while not losing accuracy in determining the location of the user device 210 as may occur if trilateration, or other less accurate techniques, alone are used to determine the location of the user device 210.

In one embodiment, the relevant subset of fingerprint locations may be based on historical determinations of the location of the user device 210. For example, each determined location of the user device 210 may be stored in a data store (e.g., the data store 279, the data store 222, etc.), database, or other storage mechanism. In determining subsequent locations of the user device 210, the device location module 236 may consider previously determined locations of the user device 210 based on received RSSIs. In some examples, such previously determined locations may not be within the region or area determined by the region location module 234, but may nevertheless be added to the relevant subset of fingerprint locations by virtue of the previously determined locations being historically (e.g., at least once) determined as the location of the user device 210 based on a comparison of newly received RSSIs to stored RSSIs, in one embodiment. In this way, certain implementations herein may leverage historical information to determine the location of the user device 210, or put another way, the more precise location than that determined by the region location module 234.

In some implementations, the server 270 may determine the location of the user device 210. According to these implementations, the memory 280 of the server 270 may include a server localization module 284 that may perform the same or similar functions as the location determination module 232 associated with the user device 210. The server localization module 284 may receive information from the user device 210, such as RSSIs received by the user device 210, identifications of the access points 240 from which the RSSIs were received, etc., and determine the location of the user device 210 based on such information. The server localization module 284 may send the determined one or more locations to the user device 210. A user application 228 of the user device 210 may use the determined one or more locations as inputs, in an example implementation.

The access points 240 may include various software and/or program modules to facilitate the processes as described herein. In one embodiment, the memory 252 of the access point 240 may include an access point (AP) communication module 254 that may configure the access points 240 to send and/or receive information from the devices shown in FIG. 2. For example, the AP communication module 254 may send information associated with an access point 240 to the user device 210 or the server 270. Such information may include, but is not limited to, an RSSI or information that may be used to determine an RSSI, a unique identification of the access point 240, and a location of the access point 240.

The above descriptions in FIG. 2 are for purposes of illustration and are not meant to be limiting. Numerous other configurations, embodiments, and descriptions may exist. For example, the region location module 234 and the device location module 236 may implement techniques other than trilateration and fingerprinting, respectively, to determine a more precise location of the user device 210. Also, locations for devices other than the user device 210 may be determined.

Figure 3:
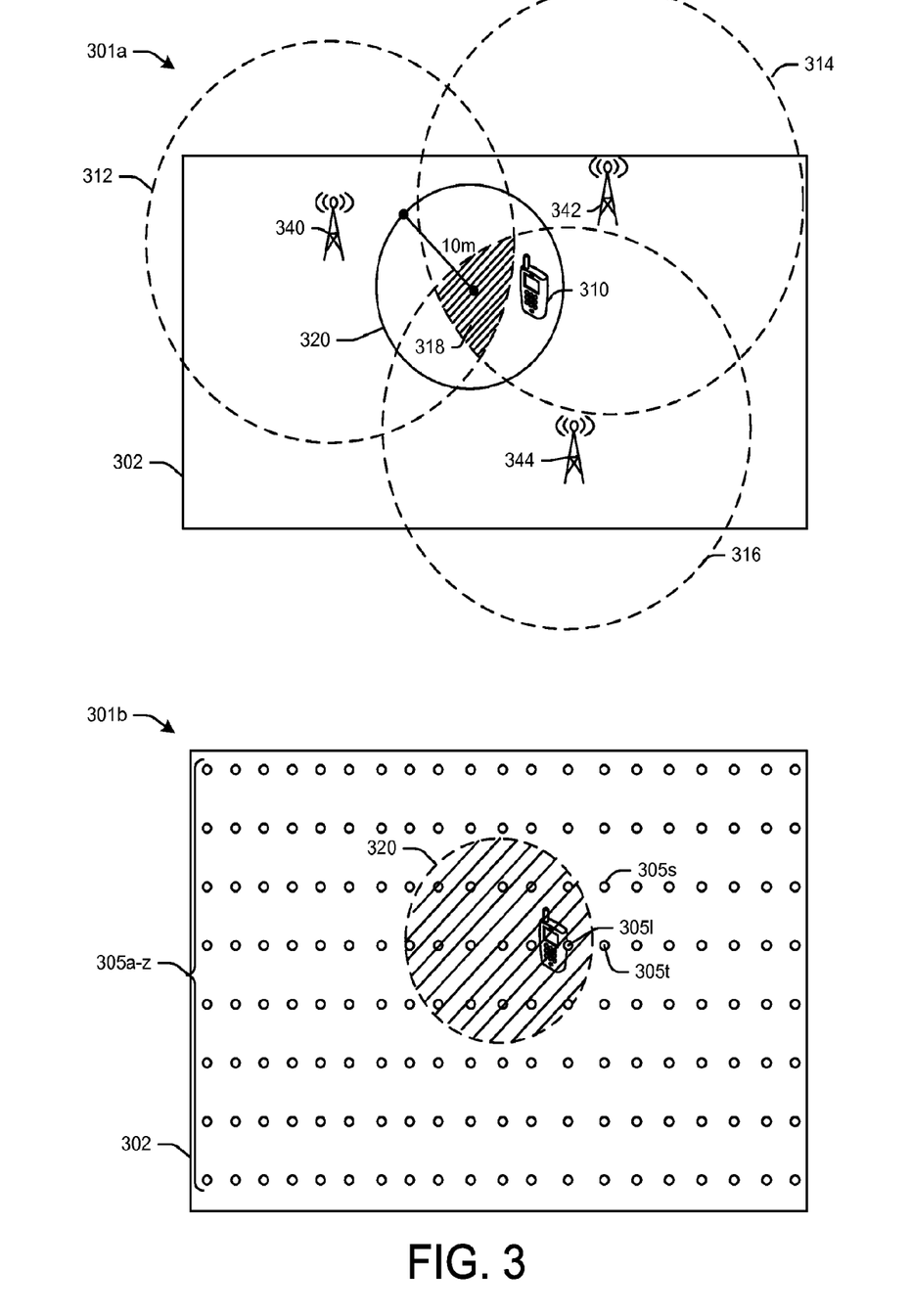
FIG. 3 illustrates an example hybrid localization technique used to determine the location of a wireless communication device, according to an embodiment of the disclosure.

FIG. 3 depicts an illustrative example 300 of determining the location of a device using a hybrid localization technique, according to an embodiment of the disclosure. The illustrative example 300 may include trilateration as applied in diagram 301a and fingerprinting as applied in diagram 301b. Both techniques may be used to determine the location of the user device 310 in a manner that reduces computation and required memory size (e.g., by the user device 310 which may be embodied by the user device 210 in FIG. 2), and thereby consumes relatively less power than that which may be consumed by implementing fingerprinting alone, while maintaining the accuracy of fingerprinting, in one implementation.

As shown in the diagram 301b, an interior space 302 may be fingerprinted such that each of the points 305a-z may be stored in accordance with one or more corresponding RSSIs received at each of the points 305a-z. In the diagram 301b, the points 305a-z may be 1.0 meters apart. Any distance or separation may exist in other examples. The labeling for the points 305a-z is meant to include each of the points shown. The points illustrated in the shaded region are meant to be a subset of the points 305a-z. The fingerprint locations and corresponding RSSIs associated with one or more access points may be stored in a data store (e.g., the data store 279 in FIG. 2), a database, or other storage mechanism in various embodiments.

The region 320 may represent a subset of the total fingerprint locations associated with the interior space 302. Such a subset may be based on the trilateration technique implemented in diagram 301a, where the same region 320 is shown. In an example embodiment, three access points 340, 342, and 344 may be used in trilateration (e.g., as implemented by the region location module 234 in FIG. 2) as the best access points to perform the trilateration given their RSSIs and their location, as non-limiting examples. The user device 310 may use the RSSIs to estimate the distance between the user device 310 and each of the access points 340, 342, and 344 from which the RSSIs were received. Such distances may be added to at least one of the coordinates of the locations of the access points 340, 342, and 344 (e.g., Manhattan distance, Euclidean distance, etc.) to determine an approximate location (X, Y coordinate) of the user device 310. The distances may be the radius, or approximate radius, of the logical sphere 312 surrounding the access point 340, the logical sphere 314 surrounding the access point 342, and the logical sphere 316 surrounding the access point 344, in one embodiment. The intersection or overlapping portion of the logical spheres may include multiple locations (referred to herein as candidate locations), the centroid of which may be an approximate location of the user device 310, in one embodiment. Techniques other than the centroid may be used in other examples. In some embodiments, the overlapping portion of the three logical spheres 312, 314, and 316 may be a single location point, which may be the approximate location of the user device 310.

In the present example, the user device 310 is shown to be outside of the overlapping portion 318. In one embodiment, an error may be used to expand the overlapping portion 318 by such error to increase the statistical confidence or certainty that the user device 310 is within the range of candidate locations, as referred to herein. In the present example, the centroid of the overlapping portion 318 may be extended in any direction such that the region 320 has a radius equal to, or approximately equal to, the error. Such an error is 10.0 meters and is used to form the region 320 in which the user device 310 resides, as shown in the example 300.

The region 320 shown in the diagram 301a may be the same region 320 shown in the diagram 301b. The region 320 as shown in the diagram 301b may represent a portion of the fingerprint points 305a-z that correspond to the approximate location of the user device 310 as determined from trilateration as shown in the diagram 301a, in one embodiment. In this way, only a portion of the fingerprint locations may be used to determine the location of the user device 310. An example calculation of the location of the user device 310 may be as follows.

For the purposes of illustration, the approximate location of the user device 310 as determined by trilateration in diagram 301a may be (8, 9), where the approximate location Loc=(X, Y). Turning to fingerprint information in diagram 301b, the relevant subset of fingerprint locations (as referred to herein) may be determined based on the region 320 in diagram 301a. For example, the distance between each of the fingerprint points 305a-z and the approximate location (8, 9) of the user device 310 as determined from trilateration may be determined. If such a distance is less than the error (e.g., 10.0 meters in the present example), then the fingerprint location associated with the determined distance may be added to the relevant subset of fingerprint locations and used to determine the location (e.g., a more precise location than that determined by trilateration) of the user device 310. Such a relevant subset of fingerprint locations may be represented by the region 320 in the present example. An example calculation of how each fingerprint location in the relevant subset may be as follows.

The fingerprint points 305m, 305h, and 305d may have locations (5, 4), (5, 5), and (5, 6), respectively. Using the Euclidean distance, the distance between the fingerprint point (5, 4) and the approximate location of the user device 310 (8, 9) is approximately 5.83 meters; the distance between the fingerprint point (5, 5) and the approximate location (8, 9) is approximately 5.0 meters; and the distance between the fingerprint point (5, 6) and the approximate location (8, 9) is approximately 4.24 meters. Because such distances are less than the error of 10.0 meters, the associated fingerprint points may be included in the region 320 of the relevant fingerprint locations for determining the location of the user device 310. Fingerprint locations outside of the region 320 may be ignored in a determination of the location of the user device 310.

RSSIs received by the user device 310 may be compared to stored RSSIs associated with each of the fingerprint locations in the interior space 302 to determine the location of the user device 310. In one implementation, a fingerprint location associated with RSSIs that are closest in value to the received RSSIs may be determined to be the location of the user device 310. Such a fingerprint location may be considered a best match, in one embodiment. In other implementations, the top 3%, 5%, 10%, etc., number of locations associated with RSSIs that are the overall closest in value to the received RSSIs may be determined as the most likely locations of the user device 310. The locations may be ranked according to Euclidean distance between the compared RSSIs, or according to various other mathematical techniques, to determine a top number or percentage of locations that represent the best location of the user device 310, in various embodiments. Averages and/or other mathematical techniques may be used in analyzing proximity of candidate locations to the user device 310 in various embodiments. In the present example, fingerprint location 305l may be determined to be the location of the user device 310 based on at least one of the example techniques above, and for purposes of illustration, is selected as the best match in the present example given that its proximity to the user device 310 is closer than other fingerprint locations.

In some embodiments, one or more fingerprint points 305a-z that may not reside within the region 320 by virtue of having a distance to the user device 310 that is lower than the error, may be added to the determination of the location of the user device 310 based at least in part on historical information. Such points (e.g., 305s and 305t), for example, may have been previously determined as the location of the user device 310 based on the same or similar RSSIs received by the user device 310. Current RSSIs may be compared to such historical RSSIs to determine whether the location associated with the historical RSSIs is the best current location of the user device 310.

The above examples in FIG. 3 are for purposes of illustration and are not meant to be limiting. Different numbers and locations of the fingerprint locations, different numbers of fingerprint locations in the region 320, different shapes of the region 320, different error values, etc., may exist in other examples.

Figure 4:
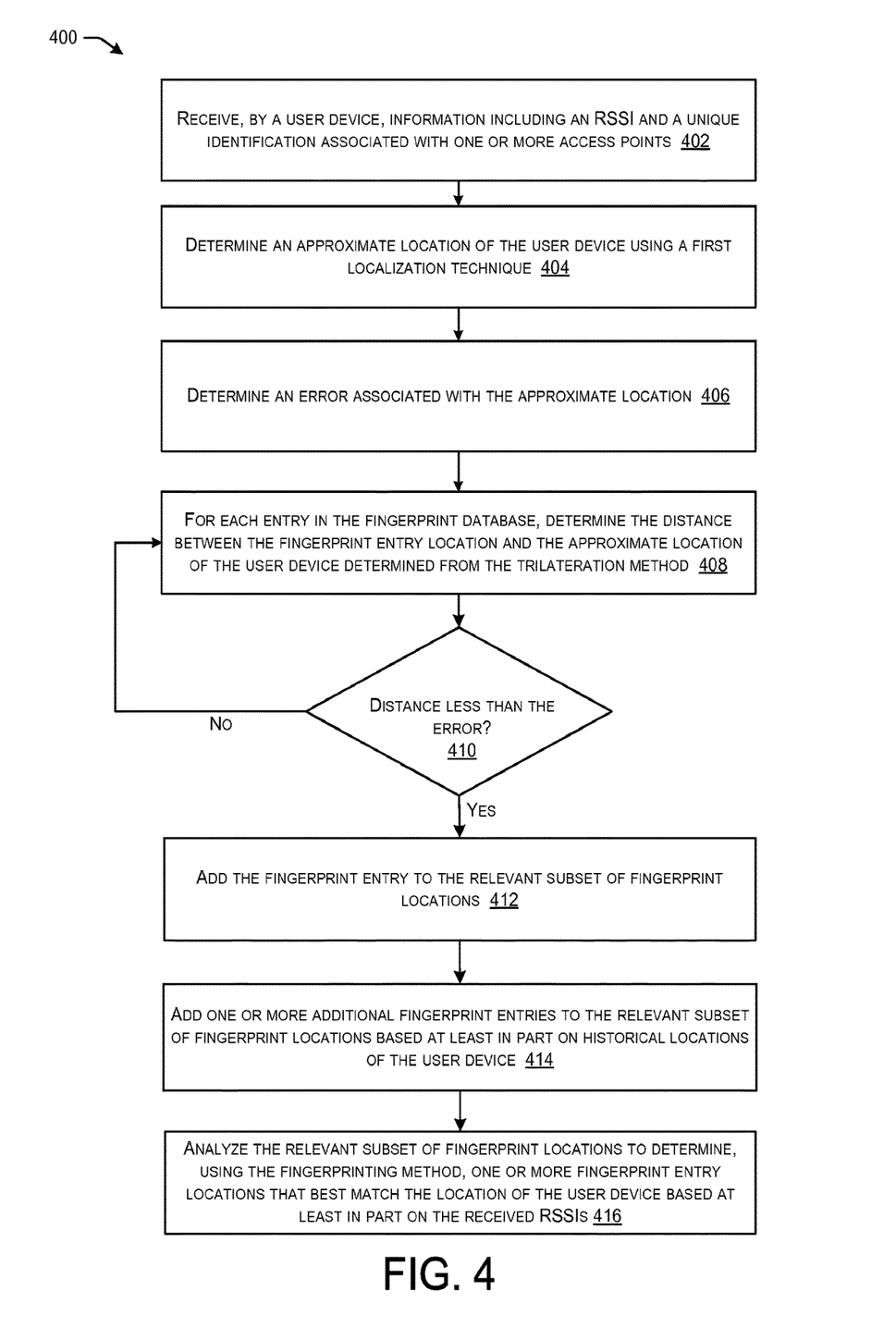
FIG. 4 illustrates a flow diagram of an example process for determining a location of a wireless communication device using hybrid localization techniques, according to an embodiment of the disclosure.

FIG. 4 depicts a flow diagram of an example process 400 for determining a location of a wireless device, such as a user device, using hybrid localization techniques, according to an embodiment of the disclosure. The example process 400 may be implemented by the user device 210 in one embodiment, or by the server 270 in another embodiment. The example process 400 may begin at block 402, where information including an RSSI and a unique identification of one or more access points, among other information, may be received by the user device (e.g., by the communication module 230).

The approximate location of the user device may be determined using various localization techniques, such as trilateration and fingerprinting. At block 404, an approximate location of the user device may be determined using a first localization technique. When the first localization technique is trilateration (e.g., as implemented by the region location module 234), respective distances between the user device and the one or more access points from which the information at block 402 was received may be determined. Further, the location of the one or more access points may be determined based at least in part on the unique identification of the one or more access points. For example, the unique identifications may be used to access the location of the one or more access points as stored in a database, data store, or other storage mechanism. In some embodiments, the location of the one or more access points may be received as part of a WiFi communication from the one or more access points to the wireless device. According to these embodiments, the location may not be looked up in the database or data store using the unique identification of the access points.

An error associated with the approximate location of the wireless device may be determined (e.g., by the region location module 234) at block 406. Such an error may increase the number of candidate locations, any of which may be the approximate location of the wireless device. In example embodiments, the error may be 5.0 meters, 10.0 meters, or any distance that provides an acceptable statistical certainty or confidence.

A second localization technique may be implemented to determine the location of the wireless device (e.g., via the device location module 236). In one embodiment, the second localization technique may include the fingerprinting method. The fingerprinting method may be applied to the approximate location of the user device, which may include one or more candidate locations as described above, rather than each stored location and corresponding RSSIs for each of the stored locations in the fingerprint database. According to one example, the distance between the fingerprint entry location and the approximate location of the wireless device may be determined for each entry in the fingerprint database (e.g., by the device location module 236) at block 408. If the determined distance is not less than the error, at block 410, then processing may return to block 408. If the determined distance is less than the error, then the fingerprint database entry may be added to a relevant subset of fingerprint locations at block 412. One or more additional fingerprint database entries may be added to the relevant subset of fingerprint locations based on historical location determinations for the user device, as described above, at block 414. At block 416, the relevant subset of fingerprint locations may be analyzed to determine one or more fingerprint entry locations that best match the location of the wireless device based on the RSSIs received by the wireless device, as described in example embodiments herein.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

In an example embodiment, there is disclosed a method. The method may include receiving, by a user device including at least one processor, information associated with one or more access points, wherein the information may include a respective received signal strength indicator (RSSI) and a respective identification of the one or more access points. The method may further include determining, by the user device, an approximate location of the user device, the approximate location including one or more candidate locations of the user device, wherein determining the approximate location of the user device may include implementing a first localization technique based at least in part on the received information. The method further include determining, by the user device, an error associated with the approximate location of the user device and increasing, by the user device, the one or more candidate locations based at least in part on the error. The method may further include determining, by the user device, a relevant subset of candidate locations based at least in part on a comparison of (i) a plurality of stored locations for an area associated with the received information to (ii) the one or more candidate locations. The method may further include determining, by the user device, a location of the user device, wherein determining the location of the user device may include implementing a second localization technique that compares the received RSSIs to stored RSSIs associated with the relevant subset of candidate locations to determine the location of the user device.

The first localization technique may be trilateration and the second localization technique may be fingerprinting. The plurality of stored locations may be associated with an indoor facility in which the user device is located. The location of the user device may be determined by the second localization technique, and may be more accurate than the approximate location of the user device determined by the first localization technique. Determining the relevant subset of candidate locations may include determining, by the user device, one or more historical locations of the user device based at least in part on the received RSSIs, and adding, by the user device, the one or more historical locations to the relevant subset of candidate locations prior to determining the location of the user device. Determining the relevant subset of candidate locations may include determining, by the user device, a respective distance between each of the plurality of stored locations and the approximate location of the user device, and if the respective distance is less than the error, adding, by the user device, to the relevant subset of candidate locations, the stored location of the plurality of stored locations associated with the respective distance. The method may further include receiving, by the user device, an indication of a severity associated with a location of the user device, and in response to the indication, applying, by the user device, at least one of the first localization technique or the second localization technique based at least in part on the severity.

In another example embodiment, there is disclosed a device. The device may include at least one radio; at least one antenna; and at least one processor. The at least one processor may receive information associated with one or more access points, wherein the information may include a respective received signal strength indicator (RSSI) and a respective identification of the one or more access points. The at least one processor may determine an approximate location of the user device, the approximate location including one or more candidate locations of the user device, wherein determining the approximate location of the user device includes implementing a trilateration based at least in part on the received information. The at least one processor may also determine an error associated with the approximate location of the user device and increase the number of the one or more candidate locations based at least in part on the error. The at least one processor may determine a relevant subset of candidate locations based at least in part on a comparison of (i) a plurality of stored locations for an area associated with the received information to (ii) the one or more candidate locations. The at least one processor may determine a location of the user device, wherein determining the location of the user device may include implementing fingerprinting, wherein fingerprinting may include comparing the received RSSIs to stored RSSIs associated with the relevant subset of candidate locations to determine the location of the user device.

The plurality of stored locations may be associated with an indoor facility in which the user device is located. The information associated with the one or more access points may receive from the user device over a cellular network or a WiFi network. When determining the relevant subset of candidate locations, the device may include the at least one processor being further configured to determine one or more historical locations of the user device based at least in part on the received RSSIs, and add the one or more historical locations to the relevant subset of candidate locations prior to determining the location of the user device. When determining the relevant subset of candidate locations, the device may include the at least one processor being further configured to determine a respective distance between each of the plurality of stored locations and the approximate location of the user device, and if the respective distance is less than the error, add to the relevant subset of candidate locations, the stored location of the plurality of stored locations associated with the respective distance. The at least one processor of the device may receive an indication of a severity associated with a location of the user device, and in response to the indication, may apply at least one of localization or fingerprinting based at least in part on the severity.

In another example embodiment, there is disclosed one or more computer-readable media storing computer-executable instructions. The one or more computer-readable media may store computer-executable instructions that, when executed by at least one processor, configure the at least one processor to perform operations which may include: receiving information associated with one or more access points, wherein the information may include a respective received signal strength indicator (RSSI) and a respective identification of the one or more access points; determining an approximate location of the user device, the approximate location including one or more candidate locations of the user device, wherein determining the approximate location of the user device may include implementing trilateration based at least in part on the received information; determining an error associated with the approximate location of the user device, wherein the error increases a number of the one or more candidate locations of the user device; determining a relevant subset of candidate locations based at least in part on a comparison of (i) a plurality of stored locations for an area at which the information was received to (ii) the increased number of the one or more candidate locations; and determining a location of the user device, wherein determining the location of the user device may include implementing fingerprinting, wherein fingerprinting may compare the received RSSIs to stored RSSIs associated with the relevant subset of candidate locations to determine the location of the user device.

The plurality of stored locations may be associated with an indoor facility in which the user device is located. The information may be associated with the one or more access points is received from the user device over a cellular network or a WiFi network. The at least one processor of the one or more computer-readable media may execute the computer-executable instructions to perform the operations including determining one or more historical locations of the user device based at least in part on the received RSSIs, and adding the one or more historical locations to the relevant subset of candidate locations prior to determining the location of the user device. The at least one processor may execute the computer-executable instructions to perform the operations including determining a respective distance between each of the plurality of stored locations and the approximate location of the user device, and if the respective distance is less than the error, adding to the relevant subset of candidate locations, the stored location of the plurality of stored locations associated with the respective distance. The at least one processor may execute the computer-executable instructions to perform the operations including receiving an indication of a severity associated with a location of the user device, and in response to the indication, applying at least one of trilateration or fingerprinting based at least in part on the severity. The at least one processor may execute the computer-executable instructions to perform the operation including receiving information associated with the plurality of stored locations.

In another example embodiment, there is disclosed a system. The system may include at least one memory that stores computer-executable instructions and at least one processor configured to access the at least one memory, wherein the at least one processor may execute computer-executable instructions. The instructions are to receive information associated with one or more access points, wherein the information may include a respective received signal strength indicator (RSSI) and a respective identification of the one or more access points. The computer-executable instructions may include to determine an approximate location of the user device, the approximate location including one or more candidate locations of the user device, wherein determining the approximate location of the user device may include implementing a first localization technique based at least in part on the received information. The computer-executable instructions also may determine an error associated with the approximate location of the user device and increase the number of the one or more candidate locations based on the error. The computer-executable instructions may include determining a relevant subset of candidate locations based at least in part on a comparison of (i) a plurality of stored locations for an area associated with the received information to (ii) the one or more candidate locations. The computer-executable instructions may also include determining a location of the user device, wherein determining the location of the user device may include implementing a second localization technique that compares the received RSSIs to stored RSSIs associated with the relevant subset of candidate locations to determine the location of the user device.

The first localization technique may be trilateration and the second localization technique is fingerprinting. The plurality of stored locations may be associated with an indoor facility in which the user device is located. The location of the user device may be determined by the second localization technique, and is more accurate than the approximate location of the user device determined by the first localization technique. The computer-executable instructions may also include determining the relevant subset of candidate locations which may include determining one or more historical locations of the user device based at least in part on the received RSSIs, and add, by the user device, the one or more historical locations to the relevant subset of candidate locations prior to determining the location of the user device. The computer-executable instructions may include determining the relevant subset of candidate locations may include determining a respective distance between each of the plurality of stored locations and the approximate location of the user device, and if the respective distance is less than the error, adding to the relevant subset of candidate locations, the stored location of the plurality of stored locations associated with the respective distance. The computer-executable instructions may further include receiving an indication of a severity associated with a location of the user device, and in response to the indication, applying at least one of the first localization technique or the second localization technique based at least in part on the severity.

In another example embodiment, there is disclosed an apparatus. The apparatus may include a means for receiving information associated with one or more access points, wherein the information may include a respective received signal strength indicator (RSSI) and a respective identification of the one or more access points. The apparatus may include a means for determining an approximate location of the user device, the approximate location including one or more candidate locations of the user device, wherein determining the approximate location of the user device may include a means for implementing a first localization technique based at least in part on the received information. The apparatus may include a means for determining an error associated with the approximate location of the user device and a means for increasing the number of the one or more candidate locations based at least in part on the error. The apparatus may include a means for determining a relevant subset of candidate locations based at least in part on a comparison of (i) a plurality of stored locations for an area associated with the received information to (ii) the increased number of the one or more candidate locations. The apparatus also may include a means for determining a location of the user device, wherein determining the location of the user device may include a means for implementing a second localization technique that compares the received RSSIs to stored RSSIs associated with the relevant subset of candidate locations to determine the location of the user device.

The first localization technique may be trilateration and the second localization technique may be fingerprinting. The plurality of stored locations may be associated with an indoor facility in which the user device is located. The location of the user device may be determined by the second localization technique, and is more accurate than the approximate location of the user device determined by the first localization technique. Determining the relevant subset of candidate locations may include a means for determining one or more historical locations of the user device based at least in part on the received RSSIs, and a means for determining adding the one or more historical locations to the relevant subset of candidate locations prior to determining the location of the user device. Determining the relevant subset of candidate locations may include a means for determining a respective distance between each of the plurality of stored locations and the approximate location of the user device, and if the respective distance is less than the error, a means for adding to the relevant subset of candidate locations, the stored location of the plurality of stored locations associated with the respective distance. The apparatus may further include a means for receiving an indication of a severity associated with a location of the user device, and in response to the indication, a means for applying at least one of the first localization technique or the second localization technique based at least in part on the severity.

What is claimed is:
1. A method comprising:
receiving, by a user device comprising at least one processor, information associated with one or more access points, wherein the information comprises a respective received signal strength indicator (RSSI) and a respective identification of the one or more access points;
determining, by the user device, an approximate location of the user device, the approximate location comprising one or more candidate locations, wherein determining the approximate location of the user device comprises implementing a first localization technique based at least in part on the received information;
determining, by the user device, an error associated with the approximate location of the user device;

increasing, by the user device, a number of the one or more candidate locations based at least in part on the error;

determining, by the user device, a relevant subset of candidate locations based at least in part on a comparison of (i) a plurality of stored locations for an area associated with the received information to (ii) the one or more candidate locations; and determining, by the user device, a location of the user device, wherein determining the location of the user device comprises implementing a second localization technique that compares the received RSSIs to stored RSSIs associated with the relevant subset of candidate locations to determine the location of the user device.

2. The method of claim 1, wherein the first localization technique is trilateration and the second localization technique is fingerprinting.

3. The method of claim 1, wherein the plurality of stored locations are associated with an indoor facility in which the user device is located.

4. The method of claim 1, wherein the location of the user device determined by the second localization technique is more accurate than the approximate location of the user device determined by the first localization technique.

5. The method of claim 1, wherein determining the relevant subset of candidate locations comprises:

determining, by the user device, one or more historical locations of the user device based at least in part on the received RSSIs; and adding, by the user device, the one or more historical locations to the relevant subset of candidate locations prior to determining the location of the user device.

6. The method of claim 1, wherein determining the relevant subset of candidate locations comprises:

determining, by the user device, a respective distance between each of the plurality of stored locations and the approximate location of the user device; and if the respective distance is less than the error, adding, by the user device, to the relevant subset of candidate locations, a stored location of the plurality of stored locations associated with the respective distance.

7. The method of claim 1, further comprising:

receiving, by the user device, an indication of a severity associated with the location of the user device; and in response to the indication, applying, by the user device, at least one of the first localization technique or the second localization technique based at least in part on the severity.

8. A device comprising:

at least one radio;

at least one antenna; and at least one processor, wherein the at least one processor is configured to:

receive information associated with one or more access points, wherein the information comprises a respective received signal strength indicator (RSSI) and a respective identification of the one or more access points;

determine an approximate location of the device, the approximate location comprising one or more candidate locations, wherein determining the approximate location of the device comprises implementing a trilateration based at least in part on the received information;

determine an error associated with the approximate location of the device;

increasing a number of the one or more candidate locations based at least in part on the error;

determine a relevant subset of candidate locations based at least in part on a comparison of (i) a plurality of stored locations for an area associated with the received information to (ii) the one or more candidate locations; and determine a location of the device, wherein determining the location of the device comprises implementing fingerprinting, wherein fingerprinting comprises comparing the received RSSIs to stored RSSIs associated with the relevant subset of candidate locations to determine the location of the device.

9. The device of claim 8, wherein the plurality of stored locations are associated with an indoor facility in which the device is located.

10. The device of claim 8, wherein the information associated with the one or more access points is received from the device over a cellular network or a WiFi network.

11. The device of claim 8, wherein determining the relevant subset of candidate locations comprises the at least one processor being further configured to:

determine one or more historical locations of the device based at least in part on the received RSSIs; and add the one or more historical locations to the relevant subset of candidate locations prior to determining the location of the device.

12. The device of claim 8, wherein determining the relevant subset of candidate locations comprises the at least one processor being further configured to:

determine a respective distance between each of the plurality of stored locations and the approximate location of the device; and if the respective distance is less than the error, add to the relevant subset of candidate locations, a stored location of the plurality of stored locations associated with the respective distance.

13. The device of claim 8, wherein the at least one processor is further configured to:

receive an indication of a severity associated with the location of the device; and in response to the indication, apply at least one of localization or fingerprinting based at least in part on the severity.

14. One or more non-transitory computer-readable media storing computer-executable instructions that, when executed by at least one processor, configure the at least one processor to perform operations comprising:

receiving information associated with one or more access points, wherein the information comprises a respective received signal strength indicator (RSSI) and a respective identification of the one or more access points;

determining an approximate location of a user device, the approximate location comprising one or more candidate locations, wherein determining the approximate location of the user device comprises implementing trilateration based at least in part on the received information;

determining an error associated with the approximate location of the device;

increasing a number of the one or more candidate locations based at least in part on the error;

determining a relevant subset of candidate locations based at least in part on a comparison of (i) a plurality of stored locations for an area associated with the received information to (ii) the one or more candidate locations; and determining a location of the user device, wherein determining the location of the user device comprises implementing fingerprinting, wherein fingerprinting compares the received RSSIs to stored RSSIs associated with the relevant subset of candidate locations to determine the location of the user device.

15. The one or more non-transitory computer-readable media of claim 14, wherein the plurality of stored locations are associated with an indoor facility in which the user device is located.

16. The one or more non-transitory computer-readable media of claim 14, wherein the information associated with the one or more access points is received from the user device over a cellular network or a WiFi network.

17. The one or more non-transitory computer-readable media of claim 14, wherein the at least one processor is further configured to execute the computer-executable instructions to perform the operations comprising:
   determining one or more historical locations of the user device based at least in part on the received RSSIs; and
   adding the one or more historical locations to the relevant subset of candidate locations prior to determining the location of the user device.

18. The one or more non-transitory computer-readable media of claim 14, wherein the at least one processor is further configured to execute the computer-executable instructions to perform the operations comprising:
   determining a respective distance between each of the plurality of stored locations and the approximate location of the user device; and
   if the respective distance is less than the error, adding to the relevant subset of candidate locations, a stored location of the plurality of stored locations associated with the respective distance.

19. The one or more non-transitory computer-readable media of claim 14, wherein the at least one processor is further configured to execute the computer-executable instructions to perform the operations comprising:
   receiving an indication of a severity associated with the location of the user device; and
   in response to the indication, applying at least one of trilateration or fingerprinting based at least in part on the severity.

20. The one or more non-transitory computer-readable media of claim 14, wherein the at least one processor is further configured to execute the computer-executable instructions to perform an operation comprising receiving information associated with the plurality of stored locations.

* * * * *